United States Patent

[11] 3,625,744

[72] Inventors Kiyoshi Juna;
Hiroyuki Nakayama; Kiyohiko Asada, all of Hiratsuka, Japan

[21] Appl. No. 16,592
[22] Filed Mar. 4, 1970
[45] Patented Dec. 7, 1971
[73] Assignee Kansai Paint Company, Limited
Amagasaki-shi, Hyogo-ken, Japan
[32] Priority Mar. 7, 1969
[33] Japan
[31] 44/16826

[54] METHOD OF COATING USING ACTINIC RADIATION
10 Claims, No Drawings

[52] U.S. Cl. .................... 117/93.31, 117/106 R, 204/159.23, 204/159.24
[51] Int. Cl. .................... B44d 1/50
[50] Field of Search .................... 117/93.31, 106 R; 204/159.23, 159.24

[56] References Cited

UNITED STATES PATENTS 2,413,973 1/1947 Howk et al. .................... 117/93.31 X

FOREIGN PATENTS 239,080 5/1967 U.S.S.R. .................... 117/93.31

OTHER REFERENCES

White et al. IBM Technical Disclosure Bull. Vol. 5 No. 5 Aug. 1962 p. 3 117-93.31

*Primary Examiner*—Alfred L. Leavitt
*Assistant Examiner*—J. H. Newsone
*Attorney*—Ostrolenk, Faber, Gerb & Soffen

ABSTRACT: A method of coating comprising the steps of applying a photosensitive catalyst or a mixture of a combination of said catalyst and a photosensitizer or a combination of said catalyst, said photosensitizer and polymeric materials on a substance to be coated, irradiating actinic light rays upon said substance while said substance being contacted with a vaporized ethylenically unsaturated compound or compounds, and thereby forming a polymer film of said ethylenically unsaturated compound or compounds.

METHOD OF COATING USING ACTINIC RADIATION

This invention relates to a quite new method of coating. In particular, this invention relates to a process for bringing a substance to be coated into contact with a vaporized substance of an ethylenically unsaturated compound, applying actinic light rays upon the substance to be coated and thereby forming a polymer film of the said compound.

In general, the prior method of forming a resin film has many defects: This method requires a process for synthesizing the resin before use, requires a process for dissolving or melting the resin, and requires a process for coating the resin. In case a coating material is prepared by using a solvent the coating process requires a step for removing the solvent in forming a film, and in particular an organic solvent to be removed is undesirable from an economic standpoint as well as from the viewpoint of safety and health.

A coating material which requires no organic solvent is also known. The method of using this material also requires a process for synthesizing a resin and a process for coating the resin.

The following method is also known: The method of forming a polymer film by placing a substance in a vacuum container filled with the vapor of a monomer and by throwing actinic light rays upon the substance (For example, A. N. Wright; Nature 215 [5,104] 953(1967). This method also has a defect that an apparatus is required to make the container vacuum, or that it is difficult to perform a continuous coating operation.

It is accordingly an object of this invention to provide an improved method based upon a new concept quite different from any of the said existing methods.

Another object of the present invention is to provide a new method for forming a polymer film by throwing the actinic light rays.

A still further object of the present invention is to form a polymeric thin and uniform film by irradiation of light.

An additional object of the present invention is to provide a new method for forming a polymer film directly from the ethylenically unsaturated compounds by throwing the actinic light rays.

A further object of the present invention is not to require the process for synthesizing a resin before applying on the coating materials.

A further object of the present invention is not to require the process for applying the polymeric materials.

And other objects and achievements of the present invention will become apparent as the description proceeds.

In order to achieve the above-mentioned object, this invention provides a new method for coating as follows. This method for coating consists of steps of bringing a substance coated with a photosensitive catalyst or with a mixture or a combination of the said catalyst and a photosensitizer into contact with a vaporized compound of an ethylenically unsaturated compound or compounds, and throwing actinic light rays upon the former substance, thereby forming a polymer film.

Ethylenically unsaturated compounds used in this invention are as follows: One functional unsaturated compounds such as styrene or its derivatives (for example, vinylbenzamide, aminostyrene); acrylonitrile, methacrylonitrile, acrylamide, methacrylamide, N-substituted acrylamide, methacrylic acid or their derivatives (for example, ester obtained from aliphatic-alcohols having 6 or less carbon atoms, benzyl-, glycidyl-, and hydroxyethyl-alcohols, etc.); acrylic acid or its derivatives (for example, ester obtained from aliphatic-alcohols having 7 or less carbon atoms, benzyl-, glycidyl-, and hydroxyethyl-alcohols, etc.); and alkylvinylesters whose acid constituents are aliphatic compounds having 11 or less carbon atoms; and polyfunctional unsaturated compounds such as divinylbenzene, diacryl esters of glycols (for example, ethylene glycol-, diethylene glycol-, triethylene glycol-, pentamethylene glycol-diacrylate, etc.), N,N'-alkylenebisacrylamides (for example, N,N'-methylene-, N,N'-ethylene-bisacrylamide, etc.), N-allylacrylamide, triallyl-cyanurate, etc.

It is preferable that the boiling point of an ethylenically unsaturated compound or of a mixture of two or more thereof is in the range of 50° to 250° C. at normal pressure. A compound which tends to sublime, such as acrylamide, may also be used.

The type of the ethylenically unsaturated compound may be selected in accordance with the use of a substance to be coated. One kind of the ethylenically unsaturated compounds or a mixture of two kinds or more thereof may be used. When a mixture of two kinds or more of them are used, the properties for forming a film are better than the case in which a single kind of such compounds is used. When a mixture of two kinds or more is used, the boiling point, vapor pressure and reactivity of each respective compound must be taken into consideration in selecting a combination in order to obtain a suitable film of any desired properties.

The photosensitive catalyst must have a larger photopolymerizable activity on ethylenically unsaturated compounds, and a weak soluble property to a certain degree in such compounds. When the photosensitive catalyst is easily soluble in ethylenically unsaturated compounds, it is violently removed from the surface of the substance to be coated, and so the formation of a film is made so much difficult. When the photosensitive catalyst is absolutely insoluble in the ethylenically unsaturated compounds, it has a defect that its film forming time becomes longer.

Any of metallic salts, dyes, azo compounds, organic carbonyl compounds, organic peroxides, organic sulfur compounds, diazonium compounds, etc. may be used as the photosensitive catalyst.

As the metallic salts, compounds having the following metallic ions are particularly effective: Fe(II), Fe(III), $UO_2$(II), U(III), Zn(II), V(III), V(V), Ce(IV), Ce(III), Ag(I), Sn(II), Mo(V), Mo(III), Au(III), Pb(IV), Pt(IV), Ti(III), Mn(V), Re(V), etc.

For example, the following may be used as the compounds: $FeCl_2$, $FeCl_3$, $Fe_2(SO_4)_3$, $Fe(NO_3)_3$, $K_3Fe(C_2O_4)_3$, $UO_2(NO_3)_2$, $UO_2(ClO_4$b'2, $UCl_3$, $ZnCl_2$, $ZnCrO_4$, $NaVO_3$, $V_2O_3$, $Ce(SO_4)_2$, $Ce(NO_3)_3$ $AgClO_4$, $SnCl_2$, $MoCl_5$, $MoCl_3$, $NaAuCl_4$, $K_2PtCl_6$, $TiCl_3$, $Pb(C_2H_5)_4$, $Mn_2(CO)_{10}$, $Re_2(CO)_{10}$, etc.

As dyes, the followings are effective: eosine, fluorescein, erythrosine, thionine, acridine, thiazine, riboflavin, methylene blue, etc.

As azo compounds, the followings are effective: azobisisobutyronitrile, azomethane tetrabromide, azoisobutylamide, etc.

As organic carbonyl compounds, the followings are effective: biacetyl, benzophenone, benzil, isobutyrophenone bromide, anthraquinone, etc.

As organic peroxides, the followings are effective: benzoylperoxide, ergosterolperoxide, naphthoyl peroxide, etc.

As organic sulfur compounds, the followings are effective: tetraethylthiuram-disulfide, diphenyl-disulfide, dibenzoyl-disulfide, o-o'-dinitrodiphenyldisulfice, methyldiethyl-dithiocarbamate, thiourea, etc.

As diazonium compounds, the followings are effective: $\alpha$-aminoanthraquinone diazoniumchloride zinc chloride, diazobenzene sulfonic acid, diazo ethyl acetate, etc.

In selecting a suitable photosensitive catalyst, careful consideration must be given to its polymerizable activity on ethylenically unsaturated compounds, its solubility therein, and its relation to the type of a substance to be coated. For example, in the case of coating such permeable substances as paper, fiber and wood, it is preferable to use catalysts having a greater solubility in ethylenically unsaturated compounds than photosensitive catalysts which are used in coating on glass and metals. As the photosensitive catalyst, any kind of metallic salts, dyes, azo compounds, organic carbonyl compounds, organic peroxides, organic sulfur compounds, diazonium compounds may be used.

As the photosensitizer, amino acids (for example, glycine, alanine, $\beta$-alanine, leucine, glutamic acid, serine, etc.), polymer and/or copolymer of these amino acids, *l*-ascorbic acid, dimethanol amine, trimethanol amine, dibutyl amine, morpholine, etc. are effective. They are used in a mixture or combination with a photosensitive catalyst.

When either the photosensitive catalyst or a mixture or combination of the said catalyst and photosensitizer is used, it is firstly dissolved in a suitable solvent, and it is applied on the surface of a substance to be coated, and then is allowed to dry. Depending upon the type of a solvent used, the photopolymerizable activity of a catalyst may be varied. It is necessary, therefore, that a suitable catalyst should be used. For example, when an iron plate is coated with an aqueous solution of $UO_2(NO_3)_2$, it has photopolymerizable activity, but an iron plate coated with a solution of acetone has no such activity. The photosensitive catalyst or a mixture or combination of said catalyst and the photosensitizer may be applied to a substance to be coated in the range of 0.01 to 2 mg./cm.$^2$ in terms of solid form, preferably in the range of 0.05 to 0.5 mg./cm$^2$.

Furthermore, when a solution of photosensitive catalyst or a mixture or combination of the said catalyst and a photosensitizer is applied on the substance to be coated, it is able to add the polymeric materials to the said solution. So the viscosity of this solution may be changed to be suitable for applying on the substance to be coated. As the polymeric materials, the followings are used: Polyester, unsaturated polyester, acrylic (or methacrylic) polymer or copolymer, silicone resin, etc. and these combination.

As the light source for throwing actinic light rays upon a substance to be coated, the following lamps may be used: Mercury vapor, xenon, fluorescence, argon glow, carbon arc and tungsten lamps, etc. The wave length of light is in the range of 200 to 700 m$\mu$, preferably in the range of 250 to 450 m$\mu$. It is not necessary that the light source have a particularly high intensity. For example, if the substance to be coated and the light source are placed near (a distance of 5–40 cm.) to each other, a mercury vapor lamp of 100 w. is able to form a film of 30$\mu$ thickness in two minutes.

When the wall of a coating chamber is made of such material as quartz glass or Pyrex glass which allows actinic light rays to pass through, light source are applied from the outside of the chamber. When the wall of the coating chamber is made of a material which cannot allow actinic light rays to pass, the light source is protected in a container which is made of such material as quartz glass or Pyrex glass that allows actinic light rays to pass, and which is placed within the chamber. The temperature within the coating chamber, the vapor pressure of ethylenically unsaturated compounds, and irradiation time is dependent upon a combination of ethylenically unsaturated compounds, photosensitive catalyst used, and a required thickness of the film to be formed.

In order to vaporize ethylenically unsaturated compounds, they are heated. A vaporized ethylenically unsaturated compounds is either produced in a coating chamber itself, or produced therein by way of a pipe. A polymerization inhibitor must be added to prohibit a thermopolymerization reaction. As the said polymerization inhibitor, a nonvolatile substance such as a copper salt or a tannic acid may be used.

A substance which is applied with either a photosensitive catalyst or a mixture or combination of the said catalyst and a photosensitizer is brought into contact with the vaporized ethylenically unsaturated compounds, with throwing actinic light rays on the substance so as to coat it with a film.

The types of materials suitable for a substance to be coated are as follows: metals such as iron, aluminum, copper, etc., plated metals with such as chrome, zinc, tin, etc.; fiber, paper, wood, synthetic plastics, glass, etc. Its shape may be in the forms of sheet, wire, fiber, plate, core, yarn, pipe, etc. Any shape may be satisfactory if it is possible to throw actinic light rays upon the substance.

As may be seen clearly from the above description, this invention has many advantages. This invention eliminates a process for synthesizing a resin and a process for coating the resin, so that this invention may solve the economic problems. This invention solves an unhealthy, disastrous and uneconomical problems arising from the vapor of solvents in a drying process. This invention has also an advantage in that a process for forming a film is shortened.

What is more, this invention makes it possible to form a film of an insoluble resin, to obtain a thin and uniform film (for example, 1$\mu$ or less) or a somewhat thicker and uniform film. As this invention requires no heating such a substance to be coated as paper, fiber, wood and so forth, therefore they can be coated without changing in its quality. Such long substances as electric wires, glass fiber and yarns can be coated uniformly and continuously. In working this operation, one can easily prevent a vaporized substance of ethylenically unsaturated compounds from escaping out of a coating chamber. Thus, this invention gives rise to no problem of sanitation and economical loss.

In order that this invention may be more readily understood, some embodiments thereof will now be described. It must be clearly understood that these are given by way of example and not to restrict this invention. The term of percent or part in the following examples indicates percent by weight or part by weight.

Examples 1–7

A 1 percent aqueous solution of a photosensitive catalyst was applied on a polished mild steel plate (50×25×0.5 mm.) with a brush. The applied plate was allowed to dry for an hour at a room temperature. While the actinic light rays were being thrown on the plate from a high-pressure mercury vapor lamp of 100 w. at a distance of 50 mm., the plate was brought into contact with a vapor (180° C.) obtained by heating styrene in a 1 l. flask with a round bottom, and a polymer film was obtained. The thickness of the film obtained in each example was shown in the table given below. An infrared spectroscopic analysis showed that this polymer film was polystyrene and had a number average molecular weight of 75,000. The tensile strength of the polymer film measure by a "Tenshiron" UTMU Type (manufactured by Toyo Sokki Kabushiki Kaisha, Japan, 40 mm./min., hereinafter the same) was 6.5 kg./mm.$^2$; the breaking elongation rate was 3.2 percent, which was the same value as that of polystyrene coated in any conventional method. (Measurement conditions: temperature: 20° C., relative humidity: 60 percent, hereinafter the same).

| Examples | Photosensitive catalyst | Irradiation time (min.) | Thickness of film ($\mu$) |
|---|---|---|---|
| 1 | $UO_2(NO_3)_2$ | 1 | 10 |
| 2 | $UO_2(NO_3)_2$ | 2 | 14 |
| 3 | $UO_2(NO_3)_2$ plus $FeCl_3$ | 2 | 30 |
| 4 | $ZnCl_2$ | 2 | 7 |
| 5 | $Ce(SO_4)_2$ | 2 | 12 |
| 6 | $FeCl_3$ plus fluoresein | 2 | 55 |
| 7 | $UO_2(NO_3)_2$ plus benzoin | 2 | 40 |

Examples 8–16

A 1 percent acetone solution of a photosensitive catalyst was applied on a sheet of fine quality paper (50×25 mm., its tensile strength being 0.5 kg./mm.$^2$), which was allowed to dry at room temperature. The sheet of fine quality paper was then hung in a 4-neck flask of Pyrex glass in which a styrene was vaporized (132° C.). A high-pressure mercury vapor lamp of 100 w. threw actinic light rays on the sheet of fine quality paper at a distance of 35 mm. for 2 minutes. Its tensile strength is improved as may be seen from the following table.

| Examples | Photosensitive Catalyst | Tensile Strength (kg./mm.$^2$) |
|---|---|---|
| 8 | o-o'-dinitrodiphenyldisulfide | 1.1 |
| 9 | Tetramethylthiuram monosulfide | 1.0 |
| 10 | Azobisisobytyronitrile | 0.8 |
| 11 | Anthraquinone | 0.8 |
| 12 | Benzoin | 1.1 |
| 13 | Benzoyl Peroxide + $UO_2(NO_3)_2$ | 1.5 |
| 14 | Diphenylsulfide + Thiazine | 1.8 |
| 15 | Azobisisobutyronitrile + Thiazine | 0.8 |

| | | |
|---|---|---|
| 16 | $UC_2(NO_3)_2$ + Eosine | 1.0 |

EXAMPLES 17–26

A 1 percent solution of a photosensitive catalyst was applied on a polished mild steel plate (50×25×0.5 mm.), which was allowed to dry at room temperature. The same apparatus as used in example 8 threw actinic light rays on the mild steel plate for 2 minutes in a chamber filled with a vapor of ethylenically unsaturated compounds to obtain a film. The thickness of each film is shown in the following table. An infrared spectroscopic analysis showed that these films was polymers corresponding to their respective ethylenically unsaturated compounds. The number average molecular weight in example 19 was 80,000; in example 21, 55,000; and in example 25, 35,000.

| Example | Ethylenically unsaturated compounds | Temperature of vaporized compound (° C.) | Photosensitive catalyst | Solvent | Thickness of film (μ) |
|---|---|---|---|---|---|
| 17 | Methyl methacrylate | 90 | AADC | Acetone | 22 |
| 18 | do | 92 | $OU_2(NO_3)_2$ | Methanol | 18 |
| 19 | do | 92 | Riboflavin plus AADC | Acetone | 36 |
| 20 | do | 91 | Fluorescein plus $FeCl_3$ | Ethanol plus methanol | 12 |
| 21 | Acrylonitrile | 74 | $ZnCl_2$ | Water | 7 |
| 22 | do | 72 | $UO_2(NO_3)_2$ plus $FeCl_3$ | do | 3 |
| 23 | do | 74 | $UO_2(NO_3)_2$ plus $ZnCl_2$ | do | 7 |
| 24 | Vinyl acetate | 70 | $UO_2(NO_3)_2$ | do | 5 |
| 25 | do | 73 | $UO_2(NO_3)_2$ plus $FeCl_3$ | do | 13 |
| 26 | do | 73 | $UO_2(NO_3)_2$ plus $ZnCl_2$ | do | 7 |

NOTE.—AADC=α-aminoanthraquinone diazonium chloride·$ZnCl_2$.

EXAMPLE 27

A 1 percent aqueous solution of $UO_2(NO_3)_2 \cdot FeCl_3$ (1:1) was applied on a polished mild steel plate (50×25×0.5 mm.), which was allowed to dry at room temperature for an hour. While the plate was being brought into contact with a vaporized compound (130° C.) obtained by heating a mixture of styrene and divinyl benzene, the same apparatus as used in example 8 threw actinic light rays upon the plate for 2 minutes, and a polymer film which was insoluble in benzene was obtained. The thickness of the film was 28μ. An infrared spectroscopic analysis of this film showed that there were an absorption of polystyrene and of two substituted phenyl radicals.

Example 28

The same method as example 1 was used. A piece of plywood plate was used instead of the polished mild steel. As a photosensitive catalyst, a 1 percent aqueous solution of a mixture of $UO_2(NO_3)_2$ and $FeCl_3$(1:1) is used, and actinic light rays were thrown for 3 minutes, and polymer film was obtained. An infrared spectroscopic analysis showed that this film was polystyrene.

Example 29

A 5 percent aqueous solution of a mixture of $UO_2(NO_3)_2$, $FeCl_3$ and thion in (5:5:1) was applied on a mild copper wire (a diameter of 1.2 mm.), which was dried for an hour. The same apparatus as used in example 8 threw actinic light rays on the plate for 8 minutes, the wire being brought into contact with a vaporized compound (130° C.) obtained by heating a mixture of styrene and divinyl benzene (1:1), and it was found that the copper wire was coated with a uniform film.

Example 30

After a glass fiber (glass roving, produced by Asahi Glass Fiber Co., Ltd.) was dipped in photosensitive catalyst composition consisting of ferric chloride one part, trimethanol amine four parts and methanol three parts, the glass fiber in a Pyrex glass pipe (thickness 1.5 mm., inner diameter 40 mm., length 200 mm.) filled the vapor (92° C.) of methyl methacrylate was irradiated actinic light rays from high-pressure mercury vapor lamp of 100 w. at a distance of 70 mm. from both sides of the glass fiber. When the glass fiber was dipped in the photosensitive catalyst composition and irradiated actinic light rays, the glass fiber was wound at a constant speed (100 mm./min.). The Pyrex glass pipe was possessed of Dimroth condenser and a charging hole of the vapor. The charging hole of the vapor was combined 2 l. 4-neck flask containing methyl methacrylate and a small quantity of cupric chloride and heating by Mantle heater. The glass fiber obtained by these operations was coated with polymethyl methacrylate of 0.5 g./m., and uniformly dyed by methylene blue and sudan R.

Example 31

The same method as example 30 was used, and then glass fiber was coated. Methanol 6 parts was used instead of methanol 3 parts. The glass fiber obtained was coated with polymethyl methacrylate of 0.15 g./m.

Example 32

The unsaturated polyester consisting of maleic anhydride 50 g. (0.5 mole), adipic acid 75 g. (0.5 mole) and triethylene glycol 180 g. (1.2 mole) was obtained by polycondensing at nitrogen gas atmosphere. The acid value and the viscosity of the obtained unsaturated polyester was 20 and 3,000 c.p.s. respectively. Then the glass fiber was in the same as example 30, using the mixture consisting of the obtained unsaturated polyester 30 parts, silver perchlorate 0.5 part and ethyl methyl ketone peroxide 0.05 part as the photosensitive catalyst and styrene as the ethylenically unsaturated compound. The glass fiber was coated formally and the amounts of the coating material was 0.4 g. per one meter glass fiber.

What is claimed is:

1. A method of coating comprising the steps of applying a photosensitive catalyst or a mixture of a combination of said catalyst and a photosensitizer or a combination of said catalyst, said photosensitizer and a polymeric materials on a substance to be coated, irradiating actinic light rays upon said substance while said substance being contacted with a vaporized ethylenically unsaturated compound or compounds, and thereby forming a polymer film of said ethylenically unsaturated compound or compounds.

2. A method of coating as claimed in claim 1, in which said photosensitive catalyst is at least one compound selected from the group consisting of metallic salts, dyes, azo compounds, organic carbonyl compounds, organic peroxides, organic sulfur compounds, and diazonium compounds.

3. A method of coating as claimed in claims 1 and 2, in which said photosensitive catalyst is at least one compound selected from the group consisting of $FeCl_2$, $FeCl_3$, $Fe_2(SO_4)_3$, $Fe(NO_3)_3$ $K_3Fe(C_2O_4)_3$, $UO_2(NO_3)_2$, $UO_2(ClO_4)_2$, $UCl_3$, $ZnCl_2$, $ZnCrO_4NaVO_3$, $V_2O_3$, $Ce(SO_4)_2$, $Ce(NO_3)_3$, $AgClo_4$, $SnCl_2$, $MoCl_5$, $MoCl_3$, $NaAuCl_4$, $K_2PtCl_6$, $TiCl_3$, $Pb(C_2H_5)_4$, $Mn_2(CO)_{10}$, $Re_2(CO)_{10}$; eosine, fluroescein, erythrosine, thionine, acridine, thiazine, riboflavin, methylene blue; azobisisobutyronitrile, azomethane tetrabromide, azoisobutylamide; biacetyl, benzophenone, benzil, isobutyrophenone bromide, anthraquinone; benzoylperoxide, ergosterolperoxide, naphthoyl peroxide; tetraethylthiuram-disulfide, diphenyl-disulfide, dibenzoyl-disulfide, o-o'-dinitrodiphenyldisulfide, methyldiethyl-dithiocarbamate, thiourea; α-aminoanthraquinone diazoniumchloride zinc chloride, diazobenzene sulfonic acid and diazo ethyl acetate.

4. A method of coating as claimed in claim 1, in which said photosensitizer is at least one compound selected from the group consisting of amino acids, polymer and/or copolymer of said amino acids, 1-ascorbic acid, dimethanol amine, trimethanol amine, dibutyl amine and morpholine.

5. A method of coating as claimed in claims 1 and 4, in which said amino acid is at least one compound selected from the group consisting of glycine, alanine, β-alanine, leucine, glutamic acid and serine.

6. A method of coating as claimed in claim 1, in which the wave length of said actinic light rays is in the range from 200 mμ to 700 mμ.

7. A method of coating as claimed in claim 1, in which said polymeric material is at least one compound selected from the group consisting of polyester, unsaturated polyester, acrylic polymer, methacrylic polymer and silicone resin.

8. A method of coating as claimed in claim 1, in which said ethylenically unsaturated compound is at least one compound selected from the group consisting of one functional ethylenically unsaturated compounds and polyfunctional ethylenically unsaturated compounds.

9. A method of coating as claimed in claims 1 and 8, in which said ethylenically unsaturated compounds is at least one compound selected from the group consisting of styrene, acrylonitrile, methacrylonitrile, acrylamide, methacrylamide, N-substituted acrylamide, methacrylic acid, acrylic acid, alkylvinylesters, divinylbenzene, diacryl esters of glycols, N,N'-alkylenebisacrylamides, N-allylacrylamide, triallylcyanurate and their derivatives.

10. A method of coating as claimed in claims 1, 8 and 9, in which the boiling points of said ethylenically unsaturated compounds are in the range from 50° to 250° C. at normal pressure.

* * * * *